US011151310B2

(12) United States Patent
Downs et al.

(10) Patent No.: US 11,151,310 B2
(45) Date of Patent: Oct. 19, 2021

(54) METHOD AND SYSTEM FOR REGULATORY DOCUMENTATION CAPTURE

(71) Applicant: JPMorgan Chase Bank, N.A., New York, NY (US)

(72) Inventors: John Cole Downs, Brooklyn, NY (US); Gavin Ramsey, Teddington (GB); Murugan Reddi, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/038,800

(22) Filed: Sep. 30, 2020

(65) Prior Publication Data

US 2021/0097231 A1 Apr. 1, 2021

Related U.S. Application Data

(60) Provisional application No. 62/908,739, filed on Oct. 1, 2019.

(51) Int. Cl.
*G06Q 30/00* (2012.01)
*G06F 40/169* (2020.01)
*G06F 40/106* (2020.01)
*G06F 16/958* (2019.01)
*G06F 16/93* (2019.01)
*G06F 16/25* (2019.01)

(52) U.S. Cl.
CPC .......... *G06F 40/169* (2020.01); *G06F 16/254* (2019.01); *G06F 16/93* (2019.01); *G06F 16/958* (2019.01); *G06F 40/106* (2020.01)

(58) Field of Classification Search
CPC .... G06F 40/169; G06F 40/106; G06F 16/958; G06F 16/93; G06F 16/254
USPC ......................................................... 715/230
See application file for complete search history.

(56) References Cited

U.S. PATENT DOCUMENTS

| | | | |
|---|---|---|---|
| 7,693,866 B1* | 4/2010 | Weaver ................... | G06F 16/93 707/999.107 |
| 7,730,113 B1* | 6/2010 | Payette .................. | G06Q 10/00 707/821 |
| 7,984,053 B2* | 7/2011 | Jackson .............. | G06F 16/3334 707/736 |
| 8,015,482 B2 | 9/2011 | Simova et al. | |
| 10,133,791 B1* | 11/2018 | Chan .................... | G06F 16/2465 |
| 10,372,798 B2* | 8/2019 | Nordine ................ | G06F 40/166 |

(Continued)

OTHER PUBLICATIONS

International Search Report and Written Opinion of the International Searching Authority in corresponding International Application No. PCT/US20/53562, dated Jan. 28, 2021.

*Primary Examiner* — Hassan Mrabi
(74) *Attorney, Agent, or Firm* — Greenblum & Bernstein, P.L.C.

(57) ABSTRACT

A method for capturing documentation information is provided. The method includes: receiving an input that relates to a regulatory body; identifying at least one jurisdiction that applies regulations in connection with the regulatory body; extracting, from a source database, at least one publication that includes information that relates to the regulations; formatting the regulations-related information from the extracted publications into a predetermined format; and outputting the formatted information to a computer display.

18 Claims, 5 Drawing Sheets

(56) References Cited

U.S. PATENT DOCUMENTS

| | | | |
|---|---|---|---|
| 2002/0141618 A1* | 10/2002 | Ciolli | G08G 1/20 382/104 |
| 2004/0064404 A1* | 4/2004 | Cohen | G06Q 10/10 705/38 |
| 2004/0252193 A1* | 12/2004 | Higgins | G08G 1/042 348/149 |
| 2005/0078658 A1* | 4/2005 | McLennan | G06Q 10/10 370/352 |
| 2005/0080643 A1* | 4/2005 | McLennan | G06Q 10/10 709/206 |
| 2006/0101027 A1* | 5/2006 | Hotchkiss | G06Q 99/00 |
| 2006/0248440 A1* | 11/2006 | Rhoads | G06F 16/382 715/236 |
| 2007/0016467 A1 | 1/2007 | John et al. | |
| 2007/0118515 A1* | 5/2007 | Dehlinger | G06F 16/382 |
| 2007/0185865 A1* | 8/2007 | Budzik | G06F 16/248 |
| 2008/0015913 A1 | 1/2008 | Courtney et al. | |
| 2008/0098292 A1* | 4/2008 | Embry | G06F 40/174 715/226 |
| 2009/0049148 A1* | 2/2009 | McLennan | G06Q 10/10 709/206 |
| 2009/0112859 A1* | 4/2009 | Dehlinger | G06F 16/382 |
| 2011/0173180 A1 | 7/2011 | Gurumurthy et al. | |
| 2012/0036125 A1* | 2/2012 | Al-Kofahi | G06Q 50/18 707/728 |
| 2012/0226655 A1* | 9/2012 | Veeramachaneni | G06F 16/10 706/54 |
| 2012/0303776 A1* | 11/2012 | Ferris | H04L 29/08072 709/223 |
| 2013/0104251 A1* | 4/2013 | Moore | G06F 21/602 726/30 |
| 2013/0151427 A1* | 6/2013 | Whelan | G09F 21/04 705/317 |
| 2013/0238316 A1* | 9/2013 | Shastri | G06F 40/10 704/9 |
| 2013/0291060 A1* | 10/2013 | Moore | G16H 40/63 726/1 |
| 2013/0297616 A1 | 11/2013 | Bubeck et al. | |
| 2014/0157579 A1* | 6/2014 | Chhabra | G06F 17/00 29/592 |
| 2014/0304505 A1* | 10/2014 | Dawson | H04L 63/0428 713/165 |
| 2014/0344172 A1* | 11/2014 | Ansari | G06Q 10/06 705/311 |
| 2015/0286630 A1* | 10/2015 | Bateman | G06K 9/00483 704/9 |
| 2015/0288713 A1* | 10/2015 | Lawrence | G06Q 10/0635 726/25 |
| 2015/0381571 A1* | 12/2015 | Plasse | H04L 63/04 726/26 |
| 2016/0004820 A1* | 1/2016 | Moore | H04L 63/1441 705/3 |
| 2016/0048696 A1* | 2/2016 | Follis | G06F 21/6209 726/28 |
| 2016/0162576 A1* | 6/2016 | Arino de la Rubia | G06F 40/279 707/739 |
| 2016/0314146 A1* | 10/2016 | Carothers | G06F 16/38 |
| 2016/0314547 A1* | 10/2016 | Carothers | G06Q 50/18 |
| 2018/0053128 A1* | 2/2018 | Costas | G06Q 50/18 |
| 2018/0150500 A1* | 5/2018 | Le | G06F 16/254 |
| 2018/0150554 A1* | 5/2018 | Le | G06F 16/215 |
| 2018/0239959 A1* | 8/2018 | Bui | G06F 40/103 |
| 2018/0330455 A1* | 11/2018 | Bayyapu | G06Q 50/18 |
| 2018/0330456 A1* | 11/2018 | Odutola | G06Q 40/06 |
| 2019/0147109 A1 | 5/2019 | Offer et al. | |
| 2019/0370918 A1* | 12/2019 | Pemmaraju | G06F 16/254 |
| 2020/0020058 A1* | 1/2020 | Stauffer | G06F 16/345 |
| 2020/0151392 A1* | 5/2020 | Crabtree | G06N 5/02 |

* cited by examiner

METHOD AND SYSTEM FOR REGULATORY DOCUMENTATION CAPTURE

CROSS-REFERENCE TO RELATED APPLICATIONS

This application claims the benefit of U.S. Provisional Patent Application Ser. No. 62/908,739, filed Oct. 1, 2019, which is hereby incorporated by reference in its entirety.

BACKGROUND

1. Field of the Disclosure

This technology generally relates to methods and systems for capturing and formatting documentation, and more particularly to methods and systems for capturing documentation that relates to a legal/regulatory function and formatting and annotating the documentation in order to facilitate access to relevant portions of the documentation.

2. Background Information

Individuals and business entities often conduct commercial activities that are affected by legal and/or regulatory provisions. Such provisions may vary widely from jurisdiction to jurisdiction, and are also subject to changes and updates that may occur at any time. As a result, there is a need to keep such individuals and business entities informed and up-to-date with respect to the current status of legal and regulatory provisions within the relevant professional pursuit.

In this aspect, the volume of news that relates to the various types of legal and regulatory provisions is vast, and the ability of a particular user to ascertain which news items are of interest is limited. For this reason, there is a need for a mechanism for formatting and annotating documentation in order to facilitate an assessment as to whether a particular news item is of significant relevance to a particular user.

SUMMARY

The present disclosure, through one or more of its various aspects, embodiments, and/or specific features or sub-components, provides, inter alia, various systems, servers, devices, methods, media, programs, and platforms for capturing, formatting, and annotating documentation that relates to a legal/regulatory function in order to facilitate access to relevant portions of the documentation.

According to an aspect of the present disclosure, a method for capturing documentation information is provided. The method is implemented by at least one processor. The method includes: receiving, by the at least one processor, an input that relates to a regulatory body, identifying, by the at least one processor, at least one jurisdiction that applies regulations in connection with the regulatory body; extracting, from a source database, by the at least one processor, at least one publication that includes first information that relates to the regulations; formatting, by the at least one processor, the included first information from the extracted at least one publication into a predetermined format; and outputting, by the at least one processor, the formatted first information to a computer display.

The method may further include annotating the formatted first information.

The annotating of the formatted first information may include applying an identifier to an annotation, applying a node identifier to indicate an item of information to which the annotation refers, and providing text that relates to the information to which the annotation refers.

The annotating of the formatted first information may further include providing a first value that defines a start position of the annotation and a second value that defines an end position of the annotation.

The annotation may include at least one from among a heading annotation that indicates a title of a corresponding area of content from within the at least one publication, a footnote annotation that provides an explanation that relates to the corresponding area of content, an internal reference annotation that provides a reference to at least one additional portion of the at least one publication to which the annotation relates, an external reference annotation that provides a reference to an external information source to which the annotation relates, a presentational annotation that indicates at least one from among text that has been struck through and text that is underlined within the at least one publication, an impacted annotation, and an additional custom annotation tag.

The outputting of the formatted first information may include outputting a plurality of selectable first information items such that when a user clicks on one of the plurality of selectable first information items, a detailed set of the first information that relates to the clicked-on item is displayed on the computer display.

The method may further include extracting, from the source database, at least one from among a Uniform Resource Locator (URL) address of a web site at which the at least one publication is accessible, second information that relates to how a file is structured on the web site, and third information that relates to a file type in which the at least one publication is presented at the web site.

The method may further include extracting, from the source database, a scope of the at least publication that corresponds to the first information to be formatted. The scope may include at least one from among fourth information that indicates a portion of the at least one publication, fifth information that indicates a version of the at least one publication, and sixth information drat indicates a publication date of the at least one publication.

The method may further include extracting, from the source database, at least one from among seventh information that indicates at least one from among a periodic interval at which the at least one publication is updated and eighth information that indicates where the seventh information is presented on the web site.

The method may further include extracting, from the source database, ninth information that indicates a relational structure of at least a subset of the first information within the at least one publication.

According to another exemplary embodiment, a computing apparatus for capturing documentation information. The computing apparatus includes a processor, a memory, a display, and a communication interface coupled to each of the processor, the memory, and the display. The processor is configured to receive an input that relates to a regulatory body; identify at least one jurisdiction that applies regulations in connection with the regulatory body; extract, from a source database, at least one publication that includes first information that relates to the regulations, format the included first information from the extracted at least one publication into a predetermined format; and output the formatted first information to the display.

The processor may be further configured to annotate the formatted first information.

The processor may be further configured to perform the annotating by applying an identifier to an annotation, applying a node identifier to indicate an item of information to which the annotation refers, and providing second information that includes text that relates to the information to which the annotation refers.

The processor may be further configured to provide a first value that defines a start position of the annotation and a second value that defines an end position of the annotation.

The annotation may include at least one from among a heading annotation that indicates a title of a corresponding area of content from within the at least one publication, a footnote annotation that provides an explanation that relates to the corresponding area of content, an internal reference annotation that provides a reference to at least one additional portion of the at least one publication to which the annotation relates, an external reference annotation that provides a reference to an external information source to which the annotation relates, a presentational annotation that indicates at least one from among text that has been struck through and text that is underlined within the at least one publication, an impacted annotation, and an additional custom annotation tag.

The processor may be further configured to output a plurality of selectable first information items such that when a user clicks on one of the plurality of selectable first information items, a detailed set of the first information that relates to the clicked-on item is displayed on the display.

The processor may be further configured to extract, from the source database, at least one from among a Uniform Resource Locator (URL) address of a web site at which the at least one publication is accessible, second information that relates to how a file is structured on the web site, and third information that relates to a file type in which the at least one publication is presented at the web site.

The processor may be further configured to extract, from the source database, a scope of the at least publication that corresponds to the information to be formatted. The scope may include at least one from among fourth information that indicates a portion of the at least one publication, fifth information that indicates a version of the at least one publication, and sixth information that indicates a publication date of the at least one publication.

The processor may be further configured to extract, from the source database, at least one from among seventh information that indicates at least one from among a periodic interval at which the at least one publication is updated and eighth information that indicates where the seventh information is presented on the web site.

The processor may be further configured to extract, from the source database, ninth information that indicates a relational structure of at least a subset of the first information within the at least one publication.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
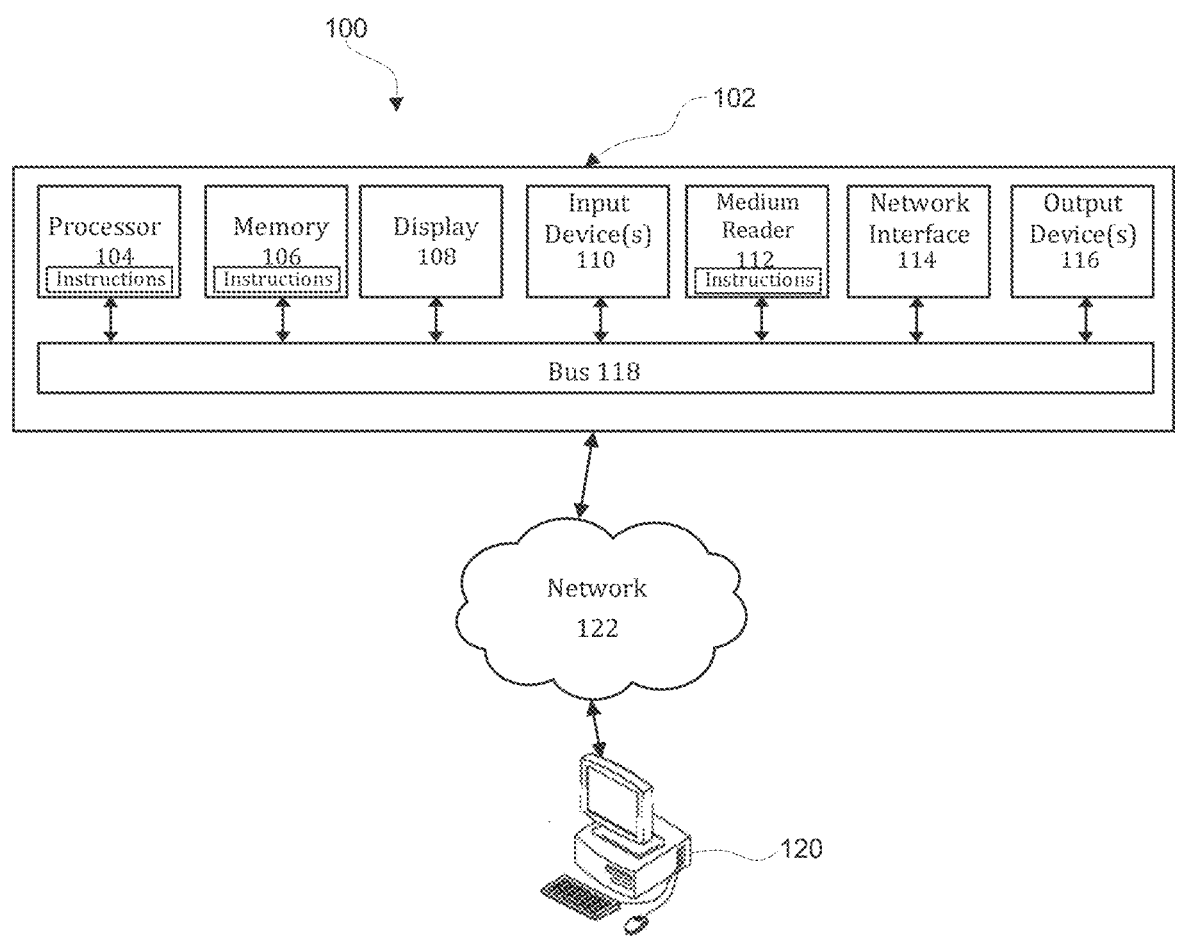
FIG. 1 illustrates an exemplar/computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 18 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for capturing, formatting, and annotating documentation that relates to a legal/regulatory function in order to facilitate access to relevant portions of the documentation.

Figure 2:
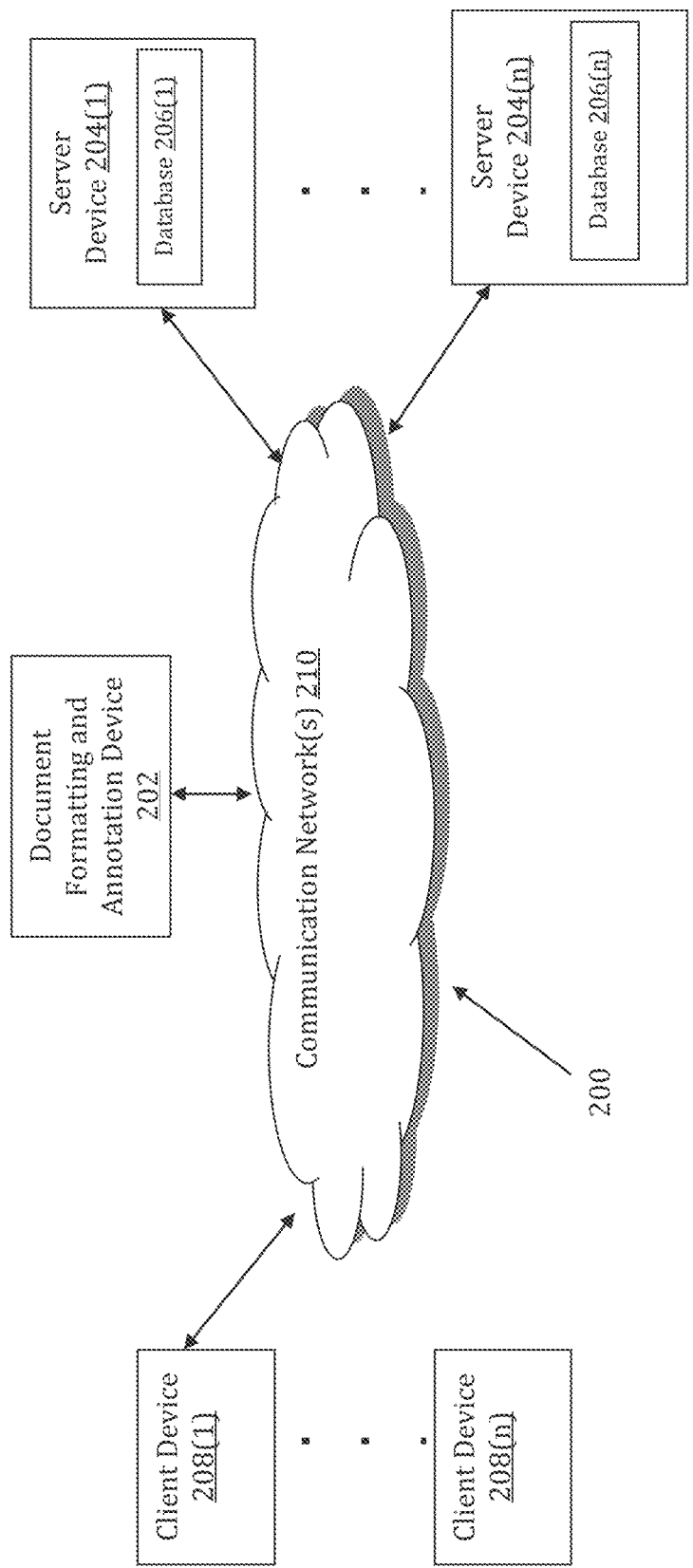
FIG. 2 illustrates an exemplary diagram of a network environment.

Referring to FIG. 2, a schematic of an exemplary network environment 200 for implementing a method for capturing, formatting, and annotating documentation that relates to a legal/regulatory function in order to facilitate access to relevant portions of the documentation is illustrated. In an exemplary embodiment, the method is executable on any networked computer platform, such as, for example, a personal computer (PC).

The method for capturing, formatting, and annotating documentation that relates to a legal/regulatory function in order to facilitate access to relevant portions of the documentation may be implemented by a Document Formatting and Annotation (DFA) device 202. The DFA device 202 may be the same or similar to the computer system 102 as described with respect to FIG. 1. The DFA device 202 may store one or more applications that can include executable instructions that, when executed by the DFA device 202, cause the DFA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DFA device 202 itself, may be located in virtual server(s) running in a cloud-based computing environment rather than being tied to one or more specific physical network computing devices. Also, the application(s) may be running in one or more virtual machines (VMs) executing on the DFA device 202. Additionally, in one or more embodiments of this technology, virtual machine(s) running on the DFA device 202 may be managed or supervised by a hypervisor.

In the network environment 200 of FIG. 2, the DFA device 202 is coupled to a plurality of server devices 204(1)-204(n) that hosts a plurality of databases 206(1)-206(n), and also to a plurality of client devices 208(1)-208(n) via communication network(s) 210. A communication interface of the DFA device 202, such as the network interface 114 of the computer system 102 of FIG. 1, operatively couples and communicates between the DFA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DFA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DFA devices that efficiently implement a method for capturing, formatting, and annotating documentation that relates to a legal/regulatory function in order to facilitate access to relevant portions of the documentation.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, tor example, teletraffic in any suitable form (e.g., voice, modem, and the like), Public Switched Telephone Network (PSTNs), Ethernet-based Packet Data Networks (PDNs), combinations thereof, and the like.

The DFA device 202 may be a standalone device or integrated with one or more other devices or apparatuses, such as one or more of the server devices 204(1)-204(n), for example. In one particular example, the DFA device 202 may include or be hosted by one of the server devices 204(1)-204(n), and other arrangements are also possible. Moreover, one or more of the devices of the DFA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received front the DFA device 202 via the communication network(s) 210 according to the HTTP-based and/or JavaScript Object Notation (JSON) protocol, for example, although other protocols may also be used.

The server devices 204(1)-204(n) may be hardware or sort ware or may represent a system with multiple servers in a pool, which may include internal or external networks. The server devices 204(1)-204(n) hosts the databases 206(1)-206(n) that are configured to store legal publications, regulatory publications, jurisdictional legal/regulatory data, and data that relates to capturing, formatting, and annotating documentation that relates to a legal/regulatory function in order to facilitate access to relevant portions of the documentation.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DFA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-20S(n) may run interface applications, such as standard web browsers or standalone client applications, which may provide an interface to communicate with the DFA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DFA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DFA device 202, the server devices 204(1)-204(n), or the client devices 208(1)-208(n), for example, may be configured to operate as virtual instances on the same physical machine. In other words, one or more of the DFA device 202, the server devices 204(1)-204(n), or the client devices 208(1)-208(n) may operate on the same physical device rather than as separate devices communicating through communication network(s) 210. Additionally, there may be more or fewer DFA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
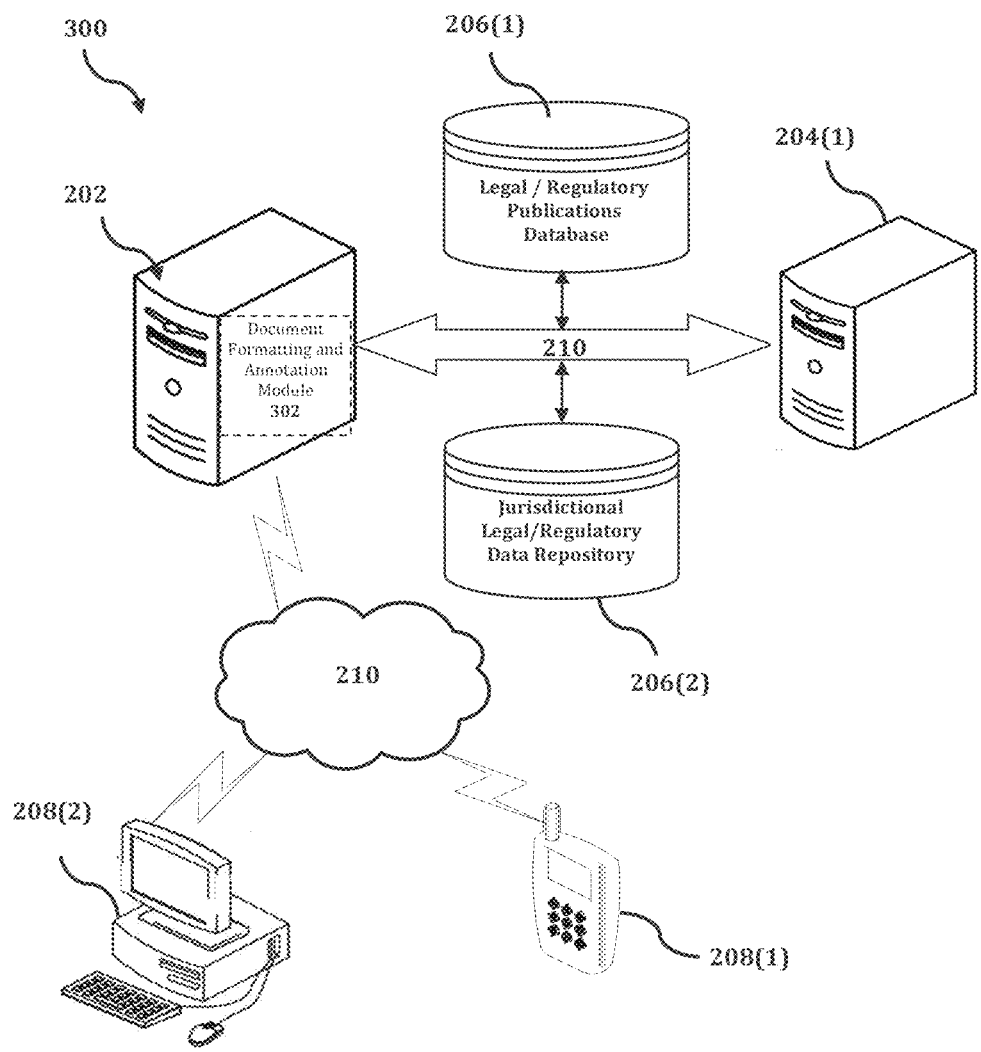
FIG. 3 shows an exemplary system for implementing a method for capturing, formatting, and annotating documentation that relates to a legal/regulatory function in order to facilitate access to relevant portions of the documentation.

The DFA device 202 is described and shown in FIG. 3 as including a document formatting and annotation module 302, although it may include other rules, policies, modules, databases, or applications, for example. As will be described below, the document formatting and annotation module 302 is configured to implement a method for capturing, formatting, and annotating documentation that relates to a legal/regulatory function in order to facilitate access to relevant portions of the documentation.

An exemplary process 300 for implementing a mechanism for capturing, formatting, and annotating documentation that relates to a legal/regulatory function in order to facilitate access to relevant portions of the documentation by utilizing the network environment of FIG. 2 is shown as being executed in FIG. 3. Specifically, a first client device 208(1) and a second client device 208(2) are illustrated as being in communication with DFA device 202. In this regard, the first client device 208(1) and the second client device 208(2) may be "clients" of the DFA device 202 and are described herein as such. Nevertheless, it is to be known and understood that the first client device 208(1) and/or the second client device 208(2) need not necessarily be "clients" of the DFA device 202, or any entity described in association therewith herein. Any additional or alternative relationship may exist between either or both of the first client device 208(1) and the second client device 208(2) and the DFA device 202, or no relationship may exist.

Further, DFA device 202 is illustrated as being able to access a legal/regulatory publications database 206(1) and a jurisdictional legal/regulatory data repository 206(2). The document formatting and annotation module 302 may be configured to access these databases for implementing a method for capturing, formatting, and annotating documentation that relates to a legal/regulatory function in order to facilitate access to relevant portions of the documentation.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DFA device 202 via broadband or cellular communication. Of course, these embodiments are merely exemplary and are not limiting or exhaustive.

Upon being started, the document formatting and annotation module 302 executes a process for capturing, formatting, and annotating documentation that relates to a legal/regulatory function in order to facilitate access to relevant portions of the documentation. In an exemplary embodiment, this process includes the following features:

1) The process analyzes content from a regulatory body to determine the structure of published laws and rules and how they are cited.
2) The process produces a mapping document that defines how that content may be represented in a universal regulatory content schema.
3) The process converts the source content from the regulatory body into the universal format. In this aspect, the conversion includes a transfer of the text from an unstructured format to a structured format.
4) The process loads the formatted convent into a regulatory application. Because the content is in a standard structured format, additional content from multiple sources may be processed in the same way. For example, a user may manually highlight a selected portion of text in a user interface, and then a citable range that corresponds to the highlighted text may be automatically generated. As another example, citations from within a source content may be used to generated intra-source navigational links and inter-source navigational links.
5) When a regulatory body updates its content, the process is repeated. Then, based on the two versions of structured content, a determination may be made as to exactly which portions of the content include textual changes and the corresponding citable blocks of laws and rules. As a result, targeted alerts of regulatory change may be provided.

Figure 4:
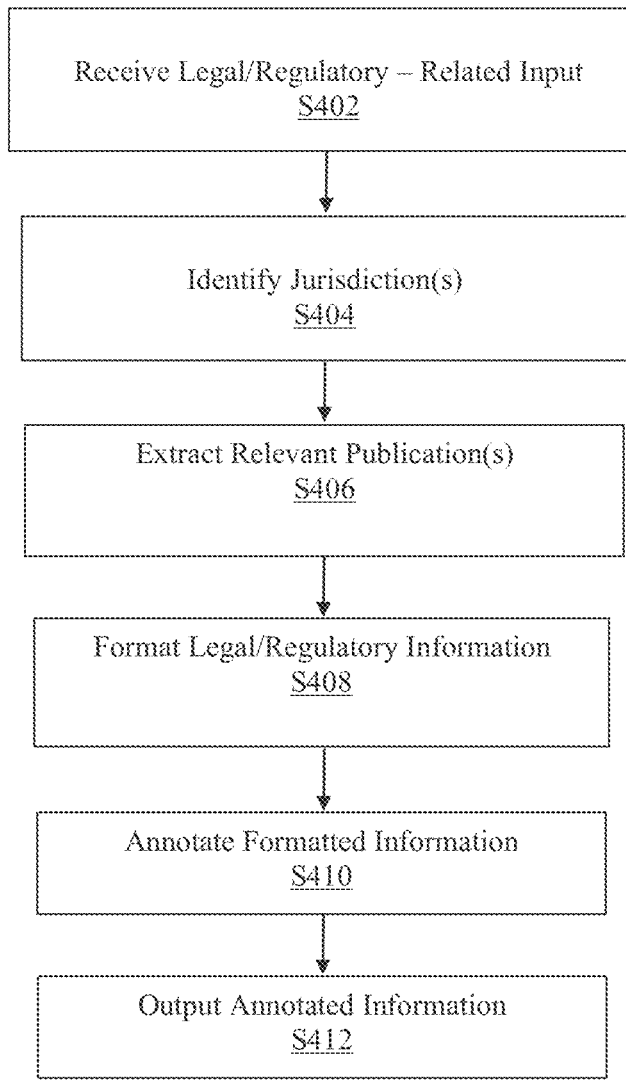
FIG. 4 is a flowchart of an exemplary method for capturing, formatting, and annotating documentation that relates to a legal/regulatory function in order to facilitate access to relevant portions of the documentation.

An exemplary process for capturing, formatting, and annotating documentation that relates to a legal/regulatory function in order to facilitate access to relevant portions of the documentation is generally indicated at flowchart 400 in FIG. 4.

In the process 400 of FIG. 4, at step S402, an input that relates to a legal/regulatory entity is received. The input may relate to a law, a rule, a regulation, a body of laws and/or regulations, an agency or organization that administers laws and/or regulations, and/or any other legal/regulatory type of input.

At step S404, at least one jurisdiction that relates to the received input is identified. The jurisdictions may include any one or more of national or federal governmental jurisdiction; a state jurisdiction; a local jurisdiction such as a county, a city, or a town; a judicial district, a governmental agency; and/or any other suitable type of jurisdiction.

At step S406, at least one publication that includes information that relates to a relevant law or regulation is extracted from a source database. In an exemplary embodiment, publications may be accessible via governmental web sites and/or databases that store legal/regulatory information that is generally available to the public.

At step S408, the information that is included in the extracted publications is formatted in a manner that is designed to provide a user with a useful representation of the information. In an exemplary embodiment, the extracted publications are captured and illustrated in a tree structure diagram, and the information is formatted in accordance with a predetermined schema.

At step S410, the formatted information is annotated. In an exemplary embodiment, the information is annotated in a manner that is designed to assist a user with performing research and analysis work that relates to the relevant legal/regulatory information that is sought by the user. Then, at step S412, the annotated information is outputted to the user, i.e., via a display on a user interface of a computer screen and/or as a printable or transmittable file format.

In an exemplary embodiment, a requirements procedure for a content extraction system is described herein below. The requirements include a Source section, a Scope section, an Update Identification section, and a Document Structure section.

In an exemplary embodiment, the Source section describes where a source may be found (URL Address), as well as information on how individual file(s) are structured on the source website. This section also describes various tile types in which the source itself is presented (PDF, HTML, etc.) and a declaration of which type may be used by a vendor to capture the content.

In an exemplary embodiment, the Scope section describes which portion(s) of a particular source should be captured by the vendors, and in particular, which years or versions of a source should be ingested, and where the corresponding file(s) may be found.

In an exemplary embodiment, the Update Identification section describes how the source being captured is updated, i.e., whether the source is updated annually, quarterly, etc. This section also describes where on the source website the information regarding updates can be found.

Figure 5:
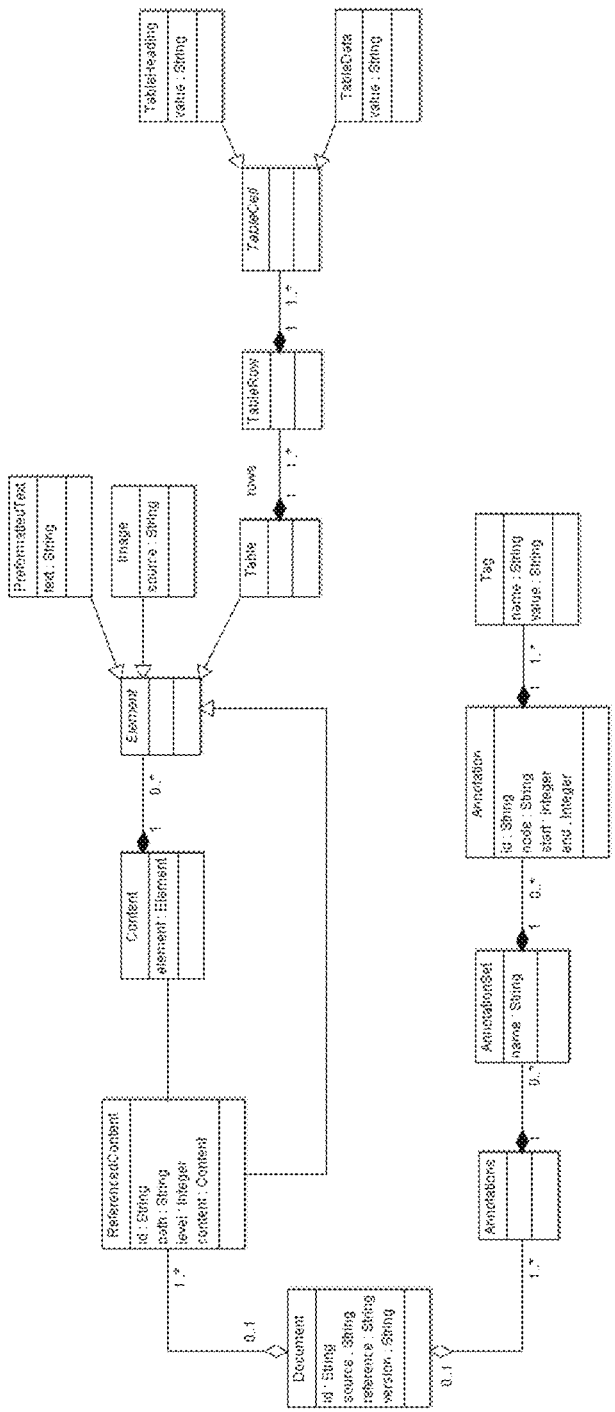
FIG. 5 is a data flow diagram that illustrates a canonical model of an exemplary implementation of a method for capturing, formatting, and annotating documentation, according to an exemplary embodiment.

In an exemplary embodiment, the Document Structure section describes how the source should be structured, or broken down in terms of levels. Referring also to FIG. 5, the schema used to structure the content may based on parent/child relationships. Example level sets are provided hereinbelow for a description of the elements in each level.

Levels
Level 0
  Required: True
  Definition: Hardcoded—/us
Level 1
  Required: True
  Definition: Hardcoded—/mainerevisedstatutes
    Hardcoded levels do not require any inputs other than the source's "region code", as well as the "file naming convention" that has been approved by the development team and agreed upon with the vendors for delivery.
Level 2
  Name: The name of the actual level (title, part, chapter, subchapter, section, etc.). If the Level is not explicitly named in the source this element should be removed to avoid any confusion.
  Required: a level can be either "True" or "False". "True" levels refer to levels that are present throughout the entirety of the document "False" levels are levels that are not present throughout the entirety of the document.
  Definition: Breaks down each level into terms that are easily understood by the capturing entities, i.e., which portions of content should be captured. It is important that the definition be as specific as possible.
  Example: This section is populated with an example from the source itself to emphasize to the capturing entities again what portions of the overall content well be captured and annotated for each level. A citation describing where in the source the example is taken from should be put in parentheses and italicized directly besides the example itself as well.

Annotated Header Text Levels

The data here will be used to populate the drop down screen at the right hand side of the source in the system platform. It is used by the end user to more easily skip through the document or documents, to locate content that pertains to their research. Therefore this section should be populated with the level(s) that would be most helpful to the end user to facilitate the action of skipping to other sections (when the source is one document/file) or skipping to other documents (when source is more then on document/file).

| Metadata | |
|---|---|
| MetaData Element | Document Location |
| Authoritative Source\* | The regulatory body that has created the source |
| Source Name\* | This is the name that will appear in the system, it should be a generic title for the source |
| Source Type\* | This explains whether or not the source content is free |
| Content Type\* | Legal development; External content; Obligations; source Records; Annotations |
| Publication Date\* | Found on the Source website; the date in which the source itself was published |
| Processing Date\* | Will always be the same for all source requirements ISO 8601 of date processed (e.g. 2016-06-07T15:10:00Z) |
| Issuing Agency\* | The entity that controls and maintains the source |
| Content URI\* | The exact location (url address) of each document/file for sources that break down into more than one file. Sources that are one file will have only one "content URI" |
| Geography\* | The source's region |
| Effective Date | The date in which the source has become effective; not applicable to all sources |
| Comment Due Date | The date stated by the authoritative entity stating when comments are due for content changes; not applicable to all sources |
| Compliance Date | N/A |
| Modified Date | The date when the source was last edited/"modified"; not applicable to all sources |
| Impacted Citation | Any citations that are impacted by the source will be mentioned here; not applicable to all sources |
| Payload Subtype | Payload subtype is identifying what the content within the source is (Code, Law, Letter, Notice, Rule, Statutes, etc.) |
| Summary | N/A |
| Status Tag Set | "Effective" or "Not-Effective" |

\*\*\*Mandatory Metadata elements will be bolded and have an asterisk (\*) next to the element name in the column the left\*\*\*

References to Other Content

This section is populated with examples of all the different reference types mentioned in the source (External references, internal references, etc.)

Exceptions

This section is used to declare any deviations from these source requirements pages, any given source may contain in detail.

Delivery Requirements

File Separation

This section is used to declare how the capturing entities should parse out and package the source's content. They can be packaged into one file containing all of the content or many separate files. The determination is made by the user. Whatever is the easiest way to view the content in the system, is how the capturing entities should be instructed to package and deliver files.

File Naming Conventions

This section declares how the individual file(s) should be named when they are delivered from the capturing entities. The name has to be as simple as possible, while still being specific enough to easily differentiate the files from one another, as well as be unique to that one source.

Citation Visualization Requirements

| Citable Levels | |
|---|---|
| Level | Is Level Citable? |
| 1 | Y |
| 2 | Y |
| 3 | N |
| 4 | N |
| 5 | N |
| 6 | N |
| 7 | Y |
| 8 | N |
| 9 | N |
| 10 | N |

This table is a visual representation of, which files will produce a standardized citation when clicked on by an end user.

| Citation Standardization Rules | |
|---|---|
| Citation Level | Rules |
| Level 2 | "Me.", + "Rev.", + "Stat", "tit.", + "Title number from level 2" Example: "Me. Rev. Stat. tit. 4" |
| Level 7 | "Me.", + "Rev.", + "Stat.", "tit.", + "Title number from level 2", + ",", + "§", + "Section number from level 7" Example: "Me. Rev. Stat. tit. 4, § 1" |

This table is a visual representation of how the standardized citation will look to a user. It is important to be as specific as possible here. Always account for all punctuation and spaces within the standardized citation.

To determine if a level should produce a standardized citation, one can use current standards. In an exemplary embodiment, some sources will be listed with an "obligation citation level" tag. This is a citation that is written for the purpose of locating what section of content the obligation pertains to. The Standardization rules should include all levels that currently have obligations written to them.

Bluebook Reference

This section is a reflection of how the "bluebook" of standardized citations cites the source.

System Display Requirements

Search Display

This section is an interpretation of how the file name will be presented in the system. It is important to be as specific as possible here as well, always account for all punctuation and spaces that are included in the name.

As much as possible, try to replicate the Search Display name as the metadata element "Source Name". This maintains the consistency with which we reference sources across the system. Also, the search display should begin at the root level of the applicable file.

Content Display

Jump Right-Hand Side Drop-Down

This section corresponds with the annotated header text levels. The levels that are presented in the drop down screen should reflect what is captured in the Annotated Header Text Levels section as described above.

Glossary

If a source contains a glossary it should be mentioned here. This section can also be used to mention sections of the document that should be captured as a glossary, although they may be listed in the document under a different name.

Legal/Copyright Considerations

This section is populated with important information regarding legal and copyright considerations as well as a location (URL Address or hyperlink) of where the complete legal and copyright considerations can be found.

Referring to FIG. 5, a Unified Modeling Language (UML) representation of a schema for implementing a method for capturing documentation that relates to a legal/regulatory function and formatting and annotating the documentation in order to facilitate access to relevant portions of the documentation according to an exemplary embodiment is illustrated. As shown in FIG. 5, the referenced content schema is a canonical model that is used to transmit a normalized view of regulatory content. It is composed of two parts: a hierarchal tree-like container for content and a set of annotations that annotate parts of the content with additional metadata.

Model Attributes

Document

A container to hold content and its related annotations:

Id

A UUID that identifies the document instance

Source

The source of the content

Reference

A reference to where the content was obtained from. This should enable this instance of the document to be retrieved.

Version

The version of the content

Referenced Content

A hierarchical self-referential container that supports blocks of preformatted text, tables and images:

Id

A UUID that identifies the referenced content node instance

Path

The logical path to the referenced content node (through the source's hierarchy). The path is in the form /a/b/c where {a,b,c} are different levels within the source hierarchy.

Because the path levels are delineated by slashes, any slashes within a level name (and thus % symbols) should be percent encoded to disambiguate them from the path separators.

Level

The depth (level number) of the referenced content node within the source hierarchy tree (as defined by the source requirements documentation).

Content

An ordered list of content elements:

Preformatted Text

A preformatted block of text. Whitespace characters inside this element are displayed as captured. For example, where text in the original is spread over two paragraphs, the preformatted text would contain an empty line separating the two blocks of text.

Image

A URL reference to an image or Base64 encoded contents of an image

Table

Represents tabular data (comprised of row and cells).

Table Rom

A row within a table.

Table Data

A data element within a table row. Whitespace characters inside this element are displayed as captured.

Table Heading

A data label within a table row. Whitespace characters inside this element are displayed as captured.

Annotations

A container to hold annotations.

Annotation Set

A logical grouping of related annotations

Name

The unique name of the annotation set

Annotation

A set of tags applied to a specified portion of referenced content

ID

A UUID that identifies the annotation instance

Node

The id of the referenced content or annotation to which the annotation applies

Start [Optional]

An integer value that defines the start position (character) of the annotation

End [Optional]

An integer value that defines the end position (character) of the annotation

Tag

A Name and Value pair assigning metadata.

Design Commentary

The referenced content model is designed to be as simple and lightweight as possible. It has the following characteristics:

Referenced Content

It is hierarchal in nature with a single root node. The root node is not explicitly marked as such but can be inferred by not having a parent.

Each node can have 0 or more children. Children are structurally identical to the parent and can have their own children.

Each node has a physical identifier (UUID) which uniquely refers to it.

Each node has a path string which identifies the relative position of the node within the structure of the source data Each node can have its own content elements. These elements can occur multiple times in any order but must be one of four types:

Standard text
Binary Image
Tabular data
A child node
Annotations

The annotations are a set of name value pairs that ascribe meaning to nodes or blocks of text within nodes.

Annotations contain a node reference which corresponds to an ID of a referenced content node or another annotation.

Annotations can additionally contain a reference to a start and end offset which indicates a subset of content within the node or annotation.

If no offset is present then the annotation refers to the entire node and all its children or the entire annotation as applicable.

Offsets

Start and end offsets represent a way of referencing characters with a referenced content node or annotation. The offset is a count of characters within the element of the specified node or annotation. The offset can be calculated as follows:

1. Extract the contained elements from the relevant referenced content node or annotation.
2. Remove all child Referenced Content elements (if applicable)
3. Extract all remaining text from remaining child elements into a single string.
4. Un-escape any percent encoded characters to their original form.
5. The start offset is the count of characters from the start of the string to the first character being referenced
6. The end offset is the count of characters from the start of the string to the last character being referenced.

Referenced Content File

Annotations:

Annotations are the application of metadata to specific portions of the content. In the Referenced Content model, the annotations are sets of name value pairs, where the name is the name of the metadata and the value its value. Each annotation has its own ID and also contains the ID of the referenced content node it applies to.

Where an annotation applies to the whole document, the annotation node attribute should refer to the ID of the top level or root node of the content hierarchy.

If there are instances where the annotation applies to just a subset, then the annotation node attribute should refer to just the relevant node in the content hierarchy.

If metadata applies to multiple sibling nodes, then there should be additional annotations for each sibling.

The annotation sets described below are examples of annotation sets that may be used. Other annotations may exist and/or may be added.

Metadata:

The source related metadata defined in the requirements document should appear in a single annotation set named 'Metadata'.

Metadata tags should be spelled out exactly as they appear in the content specification document.

```
<AnnotationSet name="Metadata">
    <Annotation id="UUID.here" node ="referenced.node.id.here">
        <Tag>
            <Name>Authoritative Source</Name>
            <Value>United States Code</Value>
        </Tag>
    </Annotation>
    <Annotation id="UUID2.here" node="referenced.node.id.here">
        <Tag>
            <Name>Issuing Agency</Name>
            <Value>Office of the Law Revision Council</Value>
        </Tag>
    </Annotation>
<AnnotationSet>
```

Headings:

Headings are extracted text strings which act as titles to selected areas of content.

All heading annotations should be in a single annotation set entitled 'Heading'.

The node attribute indicates the referenced content node that the heading applies to.

The start and end offsets indicate the start and end of the heading text.

Heading annotations are only required where specified in the requirements document.

```
<AnnotationSet name="Heading">
    <Annotation id="UUID.here" node=
    "referenced.node.id.here" start="start.offset"
    end="end.offset">
        <Tag>
            <Name>Heading Text</Name>
            <Value> Chapter 1 - Homeland Security
            Organization (sections 101 to
644)</Value>
        </Tag>
    </Annotation>
<AnnotationSet>
```

Footnotes:

Footnotes are not considered referenced content and are therefore treated as annotations within the referenced content format.

All footnote annotations should be in a single annotation set entitled 'Footnote'.

The node attribute indicates the referenced content node that the footnote applies to.

The start and end offset should apply to the footnote reference. So for the following text (taken from 1 USC Ch 1): 'Words denoting number, gender, etc.[1]', the annotation points to the "1" only.

The footnote text should be extracted from the source and placed inside the annotation. It should not appear in the <Content> block.

```
<AnnotationSet name="Footnote">
    <Annotation id="UUID.here" node=
    "referenced.node.id.here" start="start.offset"
    end="end.offset">
        <Tag>
            <Name>Reference Text</Name>
            <Value>1</Value>
        </Tag>
        <Tag>
            <Name>Footnote Text</Name>
            <Value>1 So in original. Does not conform
            to section catchline.</Value>
        </Tag>
    </Annotation>
<AnnotationSet>
```

Inactive Content:

In some source data active content will be interleaved with inactive content, such as retired or rescinded text. Where inactive text has been identified, it should be annotated as inactive.

All inactive annotations should be in a single annotation set entitled 'Inactive'.

The node attribute indicates the referenced content node that the heading applies to.

Only entire referenced content nodes can be marked as inactive. There should not be any offsets.

The annotation must include a Path value which indicates the logical path to the content being marked as Inactive.

If the inactive content spans more than one referenced content node these should be annotated individually.

```
<AnnotationSet name="Inactive">
    <Annotation id="UUID.here" node=
    "referenced.node.id.here">
        <Tag>
            <Name>Path</Name>
            <Value>/us/occ/Bank Dealer Activities/
            Introduction/Trading and Underwriting of
Municipal Securities</Value>
        <Tag>
    </Annotation>
<AnnotationSet>
```

Internal References:

Internal References are references to other nodes of content within the same source.

All internal references should be in a single annotation set entitled 'Internal Reference'.

The node attribute indicates which referenced content node the reference resides in, whilst the start and end offsets indicate the start and end of the reference text.

Each internal reference annotation contains.

The node id of the content that is being referenced (Internal Reference)

The path to the content that is being referenced (Reference Path)

The text of the reference itself (Reference Text)

Internal References can be found in both referenced content nodes and particular annotations (such as footnotes).

```
<AnnotationSet name="Internal Reference">
    <Annotation id="UUID.here" node=
    "referenced.node.id " start="start.offset"
end="end.offset">
        <Tag>
            <Name>Internal Reference</Name>
            <Value>referred.to.node.id</Value>
        </Tag>
        <Tag>
            <Name>Reference Path</Name>
            <Value>us/usc/t10/stA/ptII/ch76/
s1507/b/4</Value>
        </Tag>
        <Tag>
<Name>Reference Text</Name>
<Value>10 U.S.C. 1507(b)(4)</Value>
        </Tag>
    </Annotation>
</AnnotationSet>
```

External References

External References are references to other sources.

All internal references should be in a single annotation set entitled 'External Reference'.

The node attribute indicates which referenced content node the reference resides in, whilst the start and end offsets indicate the start and end of the reference text.

Each external annotation should contain:

The name of the source being referenced (External Reference)

A link to the content that is being referenced (Reference Link). This will be specified in the requirements documents.

The text of the reference itself (Reference Text)

External References can be found in both referenced content nodes and particular annotations (such as footnotes).

```
<AnnotationSet name="External Reference">
    <Annotation id="UUID.here" node=
    "referenced.node.id " start="start.offset"
end="end.offset">
        <Tag>
            <Name>External Reference</Name>
            <Value>Code of Federal
            Regulations</Value>
        </Tag>
        <Tag>
            <Name>Reference Link</Name>
            <Value>http://www.ecfr.gov/cgi-bin/text-
idx?tpl=/ecfrbrowse/Title12/12tab_02.tpl</Value>
        </Tag>
        <Tag>
            <Name>Reference Text</Name>
            <Value>12 CFR 1026.41(a)</Value>
        </Tag>
    </Annotation>
</AnnotationSet>
```

Presentational Annotations

Occasionally it will be necessary to capture presentational elements that are essential to the semantics of the document. These should not to be captured universally, but only where specified in the requirements or agreed separately.

All presentational annotations should be in a single annotation set entitled 'Presentation'.

The node attribute indicates which referenced content node the relevant text resides in, whilst the start and end offsets indicate the start and end of the text.

The annotation must include a 'Type' value which indicates what type of presentation is being annotated.

If two presentational tags of different types refer to the same text, they can be combined into a single annotation (as example below).

There are two types of presentation elements that can currently be captured:

'Strikethrough' which refers to text that has been ~~struck thorough~~ .

'Underline' which refers to <u>underlined</u> text.

```
<AnnotationSet name="Presentation">
    <Annotation id="UUID.here" node=
    "referenced.node.id " start="start.offset
end="end.offset">
        <Tag>
            <Name> Type</Name>
            <Value>Strikethrough</Value>
        </Tag>
        <Tag>
            <Name> Type </Name>
            <Value>Underline</Value>
        </Tag>
    </Annotation>
</AnnotationSet>
```

Universally Unique Identifiers (UUIDs) should be random (See Type-4) 128-bit sequences.

Enriched Native Format File

Annotations

The enriched native format should contain all the annotations as specified in the Referenced Content file. In addition, the enriched native format should contain annotations that represent the tree structure of the Referenced Content Model: where the requirements document specifies a level, all content that is a member of that level should be annotated as such.

Annotation Groupings

The GATE annotations should be grouped into the following sets:

Original Markup
This should include all the annotation fields found in the original source.

Structure
The annotation name should correspond to the level i.e. 'Level 1', 'Level 2'.
The annotation should have a uniquely assigned ID.
Each annotation should capture the full path of that particular instance in the referenced content tree, i.e., /a/b/c.

External Reference
This should include all external references found within the document.

Internal Reference
This should include all internal references found within the document.

Footnote
This should include all footnotes found within the document.

Heading
This set should hold all applicable Annotated Header Texts for the document.

Metadata
This should capture all relative metadata listed in the requirements, including tag sets.
Each metadata field should have its own annotation, including each unique tag set.

Physical Packaging

Filenames
Filenames are defined in the individual requirements documents.
To distinguish between Enriched Native Format (ENF) and Referenced Content (RC) files the vendor will use the following extensions:
For ENF tiles—Filename.enf.xml
For RC files—Filename.rc.xml Images Vendors are expected to download images as well as text Images should be organised on a document level basis: each document should have a single images sub-folder that uniquely ties images into their associated document. To ensure uniqueness, the sub-folder name should be the UUID of the content root node: Example Path: /Images/<Root_Node_Id>/<Image_Name>

Processing Deltas

After the initial content load, the vendor will be required to make regular updates of the content in order to keep it current. This means reprocessing the data and creating a new version of it as per a schedule defined in the requirements documents. Each time a new version is created, there is an additional task of identifying the changes in the document compared to the previous version. A change is defined as any one of the following three occurrences 1. Any change in textual content between an equivalent referenced content node (sharing the same path) in one version of the document and the next, discounting its children.

Textual content includes preformatted content and tabular data.

2. The removal of a referenced content node between one version of the document and the next.

3. The addition of a new referenced content node between one version of the document and the next.

Note: A change in a child does not constitute a change in the parent.

Impacted Citations

Changes to content are marked using Impacted Citation annotations.

All impacted citations should be in a single annotation set entitled 'Impacted Citation'.

Each annotation should have an attribute describing the id of the node that has changed.

Each annotation should contain:

The path of the impacted citation

The type of change detected. This can be one of {Modification, Addition or Removal}.

```
<AnnotationSet name="Impacted Citation">
  Annotation id="UUID.here" node="referenced.node.id ">
    <Tag>
      <Name>Citation</Name>
      <Value>/us/usc/t2/ch11/s356/E/i</Value>
    </Tag>
    <Tag>
      <Name>Change Type</Name>
      <Value>Modification </Value>
    </Tag>
  </Annotation>
<Annotation id="UUID.here" node="referenced.node.id ">
    <Tag>
      <Name>Citation</Name>
      <Value>/us/usc/t2/ch11/s356/E/ii</Value>
    </Tag>
    <Tag>
      <Name>Change Type</Name>
      <Value>Addition </Value>
    </Tag>
  </Annotation>
<Annotation id="UUID.here" node="referenced.node.id ">
    <Tag>
      <Name>Citation</Name>
      <Value>/us/usc/t2/ch11/s356/F/</Value>
    </Tag>
    <Tag>
      <Name>Change Type</Name>
      <Value>Removal </Value>
    </Tag>
  </Annotation>
</AnnotationSet>
```

Processing Regulatory Developments

Most Law and Rule sources have their upcoming changes announced by the same Regulator via Regulator, Developments from Regulatory-Monitoring Sources. The Regulatory Development can be tracked, captured and tagged to the corresponding Law and Rule source via a specific connectivity rule set. Once a rule set has been determined and captured in the BRD, monitoring sources should then be tagged with the Regulatory Development annotation set for each event captured. The Regulatory Development annotation set will include the following three tags:

Regulatory Development
  RC Filename for the full citation source that is being linked to
Reference Path
  Full Citation path that corresponds to the reference text
Reference Text
  Actual text from monitoring source

```
<AnnotationSet name="Regulatory Development">
  Annotation id="UUID.here" node="referenced.node.id" start="start.offset"
end="end.offset">
    <Tag>
      <Name>Regulatory Development</Name>
      <Value>FINRARules</Value>
    </Tag>
    <Tag>
      <Name>Reference Path</Name>
      <Value>/us/finrarules/4000. FINANCIAL AND OPERATIONAL RULES/4500.
      BOOKS, RECORDS AND REPORTS/4554. Alternative Trading Systems -
      Recording and Reporting Requirements of Order and Execution Information for
      NMS Stocks/(b)</Value>
    </Tag>
    <Tag>
      <Name>Reference Text</Name>
      <Value>Finra Rule 4500 Section b</Value>
    </Tag>
      </Annotation>
</AnnotationSet>
```

Processing Errors

Corrections are a way for vendors to fix errors in a referenced content file by republishing the content. They differ from deltas in the following ways:

Corrections logically overwrite the previous version whereas changes should increment the version.

The logical version of the document (contents of the <Version> tag) should be the same for corrections as the content it replaces. In contrast, for deltas it should be different and reflect the new version which the delta is capturing.

The physical filename for corrections will make it clear that it is not the original file. For example the original filename Filename.rc.xml will become Filename_correction_timestamp.rc.xml where timestamp is the current date and time in ISO 8601 format.

For both deltas and corrections, the physical IDs of the documents (Document ID and Referenced content IDs) will always be different between files.

The differences are summarized in the table below:

|  | Physical ID | Logical Version | Filename |
|---|---|---|---|
| Delta | Changes between files | Changes between versions | Changes between versions |
| Correction | Changes between files | Same as the corrected content | Augmented form of corrected content |

Corrections Annotations Set

Fixes to content are marked using Correction annotations.

All corrections should be in a single annotation set entitled 'Correction'.

Each annotation should have an attribute describing the id of the node that has changed.

Each annotation should describe the type of correction being made. This is one of {Modification, Addition, Removal or Relocation}.

Modification, Addition, and Removal annotations should contain the path of the correction.

Relocation annotations should contain:

The old path of the relocated content (citation from)

The new path of the relocated content (citation to)

```
<AnnotationSet name="Correction">
  <Annotation id="UUID.here" node="referenced.node.id ">
    <Tag>
      <Name>Citation</Name>
      <Value>/us/usc/t2/ch11/s356/E/i</Value>
    </Tag>
    <Tag>
      <Name>Change Type</Name>
      <Value>Modification</Value>
    </Tag>
  </Annotation>
<Annotation id="UUID.here" node="referenced.node.id ">
    <Tag>
      <Name>Citation</Name>
      <Value>/us/usc/t2/ch11/s356/E/ii</Value>
    </Tag>
    <Tag>
      <Name>Change Type</Name>
      <Value> Addition</Value>
    </Tag>
  </Annotation>
<Annotation id="UUID.here" node="referenced.node.id ">
    <Tag>
      <Name>Citation</Name>
      <Value>/us/usc/t2/ch11/s356/E/iv</Value>
    </Tag>
    <Tag>
      <Name>Change Type</Name>
      <Value> Removal </Value>
    </Tag>
  </Annotation>
<Annotation id="UUID.here" node="referenced.node.id ">
    <Tag>
      <Name>Citation From</Name>
      <Value>/us/usc/t2/ch11/s356/E/i</Value>
    </Tag>
  <Tag>
      <Name>Citation To</Name>
      <Value>/us/usc/t2/ch11/s356/F/i</Value>
    </Tag>
    <Tag>
      <Name>Change Type</Name>
      <Value> Relocation </Value>
    </Tag>
  </Annotation>
</AnnotationSet>
```

Accordingly, with this technology, an optimized process for capturing, formatting, and annotating documentation that relates to a legal/regulatory function in order to facilitate access to relevant portions of the documentation is provided.

Although the invention has been described with reference to several exemplary embodiments, it is understood that the words that have been used are words of description and illustration, rather than words of limitation. Changes may be made within the purview of the appended claims, as presently stated and as amended, without departing front the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is rot limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and ail subsequent adaptations or variations of various embodiments. Combinations of the above embodiments, and other embodiments not specifically described herein, will be apparent to those of skill in the art upon reviewing die description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for capturing documentation information, the method being implemented by at least one processor, the method comprising:
   receiving, by the at least one processor, an input that relates to a regulatory body;
   identifying, by the at least one processor, at least one jurisdiction that applies regulations in connection with the regulatory body;
   extracting, from a source database, by the at least one processor, at least one publication that includes first information that relates to the regulations;
   formatting, by the at least one processor, the included first information from the extracted at least one publication into a predetermined format; and
   outputting, by the at least one processor, the formatted first information to a computer display, wherein the formatted first information includes a plurality of selectable first information items such that when a user clicks on one of the plurality of selectable first information items, a detailed set of the first information that relates to the clicked-on item is displayed on the computer display.

2. The method of claim 1, further comprising annotating the formatted first information.

3. The method of claim 2, wherein the annotating of the formatted first information includes applying an identifier to an annotation, applying a node identifier to indicate an item of information to which the annotation refers, and providing text that relates to the information to which the annotation refers.

4. The method of claim 3, wherein the annotating of the formatted first information further includes providing a first value that defines a start position of the annotation and a second value that defines an end position of the annotation.

5. The method of claim 3, wherein the annotation includes at least one from among a heading annotation that indicates a title of a corresponding area of content from within the at least one publication, a footnote annotation that provides an explanation that relates to the corresponding area of content, an internal reference annotation that provides a reference to at least one additional portion of the at least one publication to which the annotation relates, an external reference annotation that provides a reference to an external information source to which the annotation relates, a presentational annotation that indicates at least one from among text that has been struck through and text that is underlined within the at least one publication, an impacted annotation, and an additional custom annotation tag.

6. The method of claim 1, further comprising extracting, from the source database, at least one from among a Uniform Resource Locator (URL) address of a web site at which the at least one publication is accessible, second information that relates to how a file is structured on the web site, and third information that relates to a file type in which the at least one publication is presented at the web site.

7. The method of claim 6, further comprising extracting, from the source database, a scope of the at least publication that corresponds to the first information to be formatted, wherein the scope includes at least one from among fourth information that indicates a portion of the at least one publication, fifth information that indicates a version of the at least one publication, and sixth information that indicates a publication date of the at least one publication.

8. The method of claim 7, further comprising extracting, from the source database, at least one from among seventh information that indicates at least one from among a periodic interval at which the at least one publication is updated and eighth information that indicates where the seventh information is presented on the web site.

9. The method of claim 8, further comprising extracting, from the source database, ninth information that indicates a relational structure of at least a subset of the first information within the at least one publication.

10. A computing apparatus for capturing documentation information, the computing apparatus comprising:
a processor;
a memory;
a display; and
a communication interface coupled to each of the processor, the memory, and the display, wherein the processor is configured to:
receive an input that relates to a regulatory body;
identify at least one jurisdiction that applies regulations in connection with the regulatory body;
extract, from a source database, at least one publication that includes first information that relates to the regulations;
format the included first information from the extracted at least one publication into a predetermined format; and
output the formatted first information to the display,
wherein the formatted first information includes a plurality of selectable first information items such that when a user clicks on one of the plurality of selectable first information items, a detailed set of the first information that relates to the clicked-on item is displayed on the display.

11. The computing apparatus of claim 10, wherein the processor is further configured to annotate the formatted first information.

12. The computing apparatus of claim 11, wherein the processor is further configured to perform the annotating by applying an identifier to an annotation, applying a node identifier to indicate an item of information to which the annotation refers, and providing text that relates to the information to which the annotation refers.

13. The computing apparatus of claim 12, wherein the processor is further configured to provide a first value that defines a start position of the annotation and a second value that defines an end position of the annotation.

14. The computing apparatus of claim 12, wherein the annotation includes at least one from among a heading annotation that indicates a title of a corresponding area of content from within the at least one publication, a footnote annotation that provides an explanation that relates to the corresponding area of content, an internal reference annotation that provides a reference to at least one additional portion of the at least one publication to which the annotation relates, an external reference annotation that provides a reference to an external information source to which the annotation relates, a presentational annotation that indicates at least one from among text that has been struck through and text that is underlined within the at least one publication, an impacted annotation, and an additional custom annotation tag.

15. The computing apparatus of claim 10, wherein the processor is further configured to extract, from the source database, at least one from among a Uniform Resource Locator (URL) address of a web site at which the at least one publication is accessible, second information that relates to how a file is structured on the web site, and third information that relates to a file type in which the at least one publication is presented at the web site.

16. The computing apparatus of claim 15, wherein the processor is further configured to extract, from the source database, a scope of the at least publication that corresponds to the first information to be formatted, wherein the scope includes at least one from among fourth information that indicates a portion of the at least one publication, fifth information that indicates a version of the at least one publication, and sixth information that indicates a publication date of the at least one publication.

17. The computing apparatus of claim 16, wherein the processor is further configured to extract, from the source database, at least one from among seventh information that indicates at least one from among a periodic interval at which the at least one publication is updated and eighth information that indicates where the seventh information is presented on the web site.

18. The computing apparatus of claim 17, wherein the processor is further configured to extract, from the source database, ninth information that indicates a relational structure of at least a subset of the first information within the at least one publication.

\* \* \* \* \*